United States Patent
Chapin et al.

(10) Patent No.: US 7,966,803 B2
(45) Date of Patent: Jun. 28, 2011

(54) PULSE DETONATION COMBUSTOR WITH FOLDED FLOW PATH

(75) Inventors: David Michael Chapin, Niskayuna, NY (US); Kevin Michael Hinckley, Saratoga Springs, NY (US); Venkat Eswarlu Tangirala, Niskayuna, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1762 days.

(21) Appl. No.: 11/346,809

(22) Filed: Feb. 3, 2006

(65) Prior Publication Data
US 2007/0180810 A1    Aug. 9, 2007

(51) Int. Cl.
*F02C 5/00* (2006.01)
(52) U.S. Cl. .................. 60/39.76; 60/39.77; 60/247
(58) Field of Classification Search .......... 60/722, 60/39.38, 39.76, 39.77, 39.78, 247, 249, 60/772, 776, 752, 760
See application file for complete search history.

(56) References Cited

U.S. PATENT DOCUMENTS

| | | | |
|---|---|---|---|
| 6,629,674 B1 | 10/2003 | Saddoughi et al. | |
| 6,666,018 B2 | 12/2003 | Butler et al. | |
| 6,813,878 B2 | 11/2004 | Kraft | |
| 6,889,505 B2 | 5/2005 | Butler et al. | |
| 6,928,804 B2 | 8/2005 | Venkataramani et al. | |
| 7,093,445 B2 * | 8/2006 | Corr et al. ................ | 60/777 |
| 2003/0029160 A1 * | 2/2003 | Johnson et al. ........... | 60/204 |

OTHER PUBLICATIONS

U.S. Appl. No. 10/870,877, filed Jun. 18, 2004, Venkat Tangirala, Keith McManus and Anthony Dean.
U.S. Appl. No. 10/870,898, filed Jun. 18, 2004, Venkat Tangirala, Keith McManus and Anthony Dean.

* cited by examiner

*Primary Examiner* — Michael Cuff
*Assistant Examiner* — Vikansha S Dwivedi
(74) *Attorney, Agent, or Firm* — Richard A. DeCristofaro

(57) ABSTRACT

A pulsed detonation combustor (PDC) is described. The PDC includes an outer casing defining a first hollow chamber configured to receive a flow and an inner liner. The inner liner includes at least one portion positioned within the first hollow chamber and configured to receive the flow from a plenum formed between the outer casing and inner liner. The PDC further includes a flow turning device with geometric features configured to direct the flow from the plenum to a second hollow chamber defined within the inner liner. The PDC also includes at least one fuel injection port located downstream of an inlet to the outer casing and an ignition device located downstream of the at least one fuel injection port and configured to periodically ignite fuel.

20 Claims, 9 Drawing Sheets

PULSE DETONATION COMBUSTOR WITH FOLDED FLOW PATH

BACKGROUND OF THE INVENTION

The present invention generally relates to cyclic pulsed detonation combustors (PDCs) and more particularly to a design that incorporates a "folded" flow path in order to cool the PDC using an oxidizer and/or fuel prior to a combustion process and, which utilizes heat produced in the combustion process to preheat and mix fuel and/or oxidizer and vaporize fuel prior to initiation.

A typical pulse detonation combustion system generates a thrust upon igniting a mixture of fuel and air within the system. However, the thrust may not be effectively generated and may be expensive to generate.

BRIEF DESCRIPTION OF THE INVENTION

In one aspect, A pulsed detonation combustor (PDC) is described. The PDC includes an outer casing defining a first hollow chamber configured to receive a flow and an inner liner. The inner liner includes at least one portion positioned within the first hollow chamber and configured to receive the flow from a plenum formed between the outer casing and inner liner. The PDC further includes a flow turning device with geometric features configured to direct the flow from the plenum to a second hollow chamber defined within the inner liner. The PDC also includes at least one fuel injection port located downstream of an inlet to the outer casing and an ignition device located downstream of the at least one fuel injection port and configured to periodically ignite fuel.

In another aspect, a pulsed detonation combustor system is described. The pulse detonation combustor system includes a fuel supply configured to supply fuel, an oxidizer supply configured to supply an oxidizer, and an outer casing defining a first hollow chamber configured to receive a flow from at least one of the fuel supply and the oxidizer supply. The pulsed detonation combustor system further includes an inner liner comprising at least one portion positioned within the first hollow chamber and configured to receive the flow from a plenum formed between the outer casing and inner liner, a flow turning device with geometric features configured to direct the flow from the plenum to a second hollow chamber defined within the inner liner, and at least one fuel injection port located downstream of an inlet to outer casing. The pulsed detonation combustor system also includes an initiation device located downstream of the at least one fuel injection port and configured to periodically ignite fuel.

In yet another aspect, a method for generating thrust in a self-cooling, pre-heating pulsed detonation combustor is described. The method includes receiving a flow in an outer casing defining a first hollow chamber, receiving the flow from a plenum formed between the outer casing and an inner liner located within the first hollow chamber, directing the flow from the plenum to a second hollow chamber within the inner liner, placing at least one fuel injection port downstream of an inlet to the outer casing, and periodically igniting fuel by an initiation device located downstream of the at least one fuel injection port.

DETAILED DESCRIPTION OF THE INVENTION

As used herein, a "pulse detonation combustor" (PDC) includes a device or system that produces both a pressure rise and velocity increase from a single, or a series of repeating, detonations or quasi-detonations within the device. A "quasi-detonation" is a supersonic turbulent combustion process that produces a pressure rise and velocity increase higher than a pressure rise and velocity increase produced by a sub-sonic deflagration wave. Embodiments of PDCs include a device that ignites a fuel/oxidizer mixture, such as, for example, a fuel/air mixture, and a detonation chamber, in which pressure wave fronts initiated by an ignition coalesce to produce a detonation wave. Each detonation or quasi-detonation is initiated either by an external ignition, such as spark discharge or laser pulse, or by gas dynamic processes, such as shock focusing, autoignition or by another detonation (cross-fire). A geometry of a detonation chamber is such that the pressure rise of the detonation wave expels combustion products out an exhaust of the PDC to produce a thrust force. Pulse detonation can be accomplished in a number of types of chambers, including detonation chambers, shock tubes, resonating detonation cavities and annular detonation chambers. As used herein, the term "casing" includes tubes having circular or alternatively non-circular cross-sections. Each of the circular and non-circular cross-sections have either a constant or a varying cross sectional area. Exemplary casings include cylindrical tubes and tubes having polygonal cross-sections, such as, for example, hexagonal tubes. Additionally, as used herein, the term "liner" includes tubes having the circular or alternatively the non-circular cross-sections. Exemplary liners include cylindrical tubes and tubes having polygonal cross-sections, such as, for example, hexagonal tubes. As used herein, "downstream" refers to a direction of flow of at least one of fuel or oxidizer.

Figure 1:
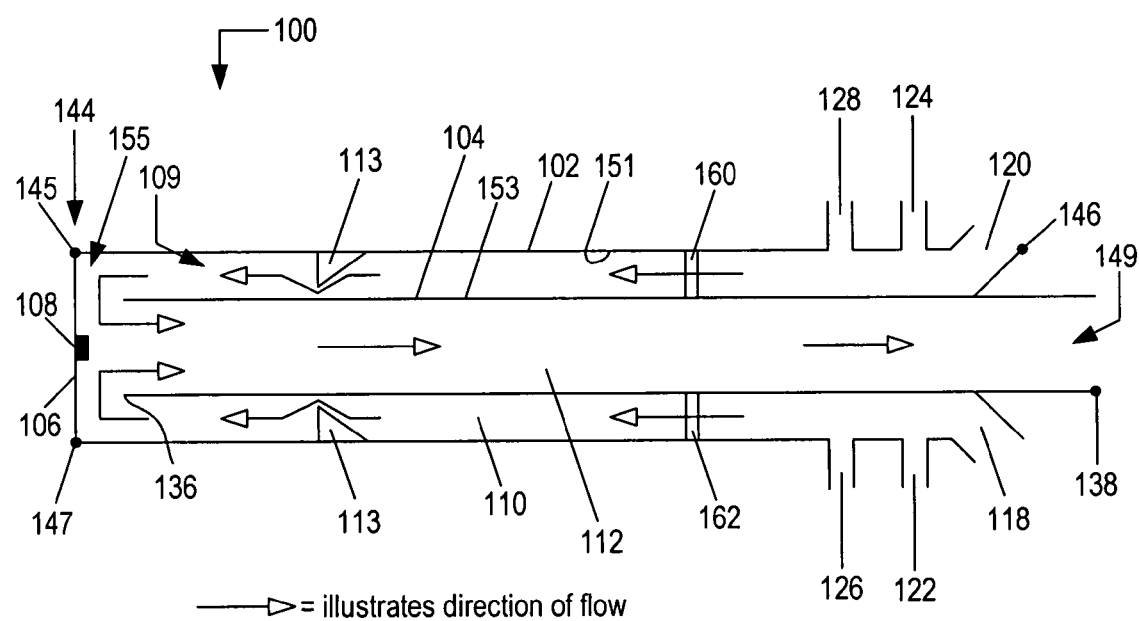
FIG. 1 is a schematic diagram of an exemplary self-cooling, pre-heating Pulsed Detonation Combustor (PDC) illustrating a folded flow path.
Figure 2:
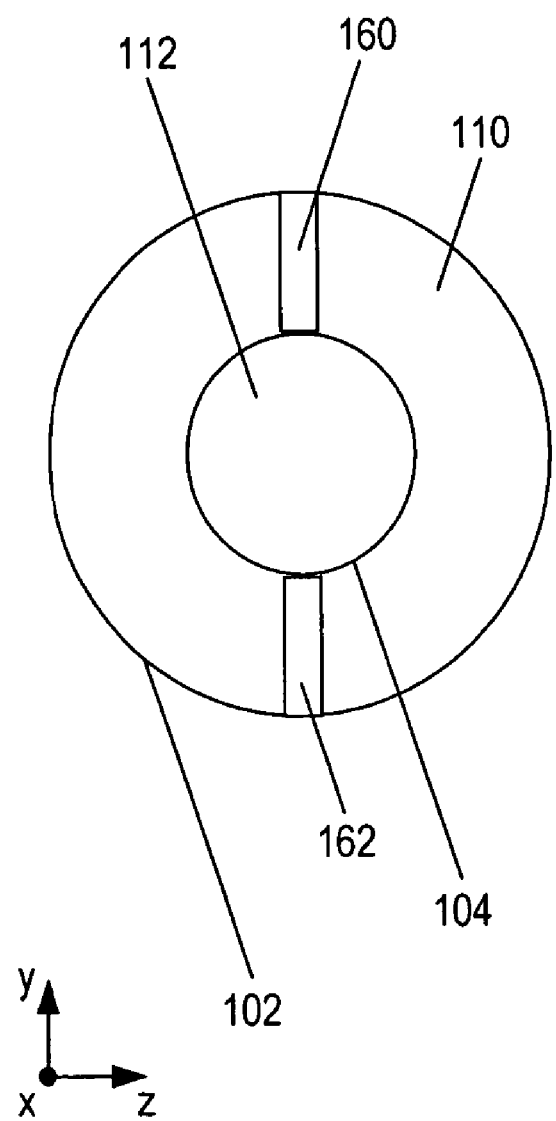
FIG. 2 is a cross-sectional view of the system shown in FIG. 1.

FIGS. 1 and 2 are schematic diagrams of an exemplary self-cooling, pre-heating PDC 100, with folded flow path, for generating thrust. PDC 100 is referred to as a system 100. System 100 includes an outer casing 102, an inner liner 104, a flow turning device 106, an ignition device 108, an outer chamber 109, a plenum 110 formed between outer casing 102 and inner liner 104, a chamber 112 formed within inner liner 104, a protrusion 113 for the re-atomization of coalesced liquid fuel droplets, a plurality of oxidizer supply inlets 118 and 120, a plurality of gaseous fuel supply inlets 122 and 124, and a plurality of liquid fuel supply inlets 126 and 128. Outer chamber 109 is a hollow chamber formed within outer casing 102. At least a portion of inner liner 104 is placed within outer chamber 109. In an alternative embodiment, system 100 may include one of inlets 122 and 124. In another alternative embodiment, system 100 may include one of inlets 126 and 128. In yet another alternative embodiment, system 100 may includes one of inlets 118 and 120. Protrusion 113 is made of a material, such as, stainless steel, aluminum, inconel, or carbon steel. Protrusion 113 is integrated with, such as machined, or attached to, such as welded, glued, and/or bolted, an inner surface 151 of outer casing 102. System 100 is operable with a plurality of different fuels including, but not limited to, gaseous fuels, such as, hydrogen, ethylene, natural gas, or propane, liquid fuels, such as, gasoline, kerosene, or aviation fuels, and a plurality of oxidizers including, but not limited to, air. Ignition device 108 can be, but is not limited to being, a spark plug, a plasma igniter, and/or a laser source.

Each of fuel supply inlets 122, 124, 126, and 128 may include a valve to allow an active pulsing of fuel into the plenum 110. Alternatively, a valve may be coupled to a supply line that is coupled to inlet 122 and the valve is pulsed to provide a supply of fuel to plenum 110 via inlet 122. In another alternative embodiment, a valve may be coupled to a supply line that is coupled to inlet 124 and the valve is pulsed to provide a supply of fuel to plenum 110 via inlet 124. Optionally, a valve may be coupled to a supply line that is coupled to inlet 126 and the valve is pulsed to provide a supply of fuel to plenum 110 via inlet 126. In yet another alternative embodiment, a valve may be coupled to a supply line that is coupled to inlet 128 and the valve is pulsed to provide a supply of fuel to plenum 110 via inlet 128.

Each of oxidizer supply inlets 118 and 120 may also include a valve to actively control a flow of oxidizer into plenum 110. Alternatively, a valve may be coupled to a supply line that is coupled to oxidizer supply inlet 118 and the valve actuated to control a flow of oxidizer to plenum 110 via oxidizer supply inlet 118. In another alternative embodiment, a valve may be coupled to a supply line that is coupled to oxidizer supply inlet 120 and the valve actuated to control a flow of oxidizer to plenum 110 via oxidizer supply inlet 120. An example of a valve includes, but is not limited to, a solenoid valve, and the valve is controlled via a controller to open and close at desired intervals. The controller controls an activation of ignition device 108 to ignite fuel and oxidizer mixture. As used herein, the term controller is not limited to just those integrated circuits referred to in the art as a controller, but broadly refers to a processor, a microprocessor, a microcontroller, a programmable logic controller, an application specific integrated circuit, and another programmable circuit.

In the exemplary embodiment, inner-liner 104 is a substantially round cylinder, and extends substantially parallel to an x-axis from a y-z plane defined by a point 136 to a y-z plane defined by a point 138. Moreover, outer casing 102 extends parallel to the x-axis from a y-z plane defined by a point 145 of outer casing 102 to a y-z plane defined by a point 146 of outer casing 102. A y-z plane is formed by a y-axis and a z-axis as oriented in the FIG. 1. Accordingly, in the exemplary embodiment, outer casing 102 is aligned substantially concentrically with respect to inner liner 104, and each of outer casing 102 and inner liner 104 is a hollow cylinder having a substantially circular cross-section. Alternatively, outer casing 102 and inner liner 104 have non-circular cross-sectional profiles, such as, a polygonal cross-section, a triangular cross-section, a square cross-section, and/or a hexagonal cross-section. In another alternative embodiment, inner liner 104 has a different cross-sectional profile than that of outer casing 102. Cross-sectional profiles of inner liner 104 and outer casing 102 are formed in a y-z plane.

Referring to FIG. 1, although each of outer casing 102 and inner liner 104 extend substantially linearly along the x-axis, in an alternative embodiment, outer casing 102 and inner liner 104 extend arcuately, such as spirally, along the x-axis and as such are not parallel to the x-axis. In the exemplary embodiment, inner liner 104 has a diameter ranging from 1.5 inches to 2.5 inches, and outer casing 102 has a diameter ranging from two inches to three inches. Flow turning device 106 is integrated with outer casing 102 or is coupled, such as glued, welded, and/or bolted, to an end 144 between point 145 and a point 147 of outer casing 102. Furthermore, in an alternative embodiment, flow turning device 106 is curved. For example, flow turning device 106 is an end cap, or has a concave cross-section in an x-y plane formed by an x-axis and the y-axis and an x-z plane formed by the x-axis and the z-axis. In the exemplary embodiment, a plenum 110 is defined between outer casing 102 and inner liner 104 that extends substantially parallel to the x-axis. In the same embodiment, inner liner 104 defines a chamber 112 that extends substantially parallel to the x-axis. Plenum 110 and inner chamber 112 are arranged substantially concentrically. Flow turning device 106 enables a flowing substance, such as fuel and/or an oxidizer, to enter inner chamber 112 from plenum 110, the flowing substance flows within chamber 112, and the flowing substance exits at a y-z plane at an end 149 of inner liner 104.

System 100 includes a plurality of support structures 160 and 162, which reinforce plenum 110 to keep inner liner 104 substantially concentric with outer casing 102. Any number, such as ranging from and including one to ten, of each of the support structures 160 and 162 can be placed along the length of the plenum 110. The length of plenum 110 is parallel to the x-axis. Support structures 160 and 162 are integrated with, such as machined, or attached to, such as glued, welded, and/or bolted to, inner surface 151 or alternatively to an outer surface 153 of inner liner 104. Outer surface 153 and inner surface 151 face plenum 110. Examples of each of support structures 160 and 160 include, but are not limited to, a bolt, a dowel, and a fin. In alternative embodiment, system 100 does not include support structures 160 and 162 to maintain plenum 110 along a length of outer casing 102. The length of outer casing 102 is parallel to the x-axis.

In exemplary system 100, an oxidizer, including but not limited to air, flows from a supply or a plurality of supplies including, but not limited to, air compressors, into plenum 110 via inlets 118 and 120. Gaseous fuel may enter plenum 110 through inlets 122 and 124 via a plurality of orifices around circumference of outer casing 102 or through a mixing element in plenum 110. Liquid fuel may enter plenum 110 via inlets 126 and 128, via a plurality of atomizing nozzles or orifices located around circumference of outer casing 102, and/or via a mixing element in plenum 110. As liquid or gaseous fuel enters plenum 110, the fuel mixes with oxidizer supplied through inlets 118 and 120. This mixture then flows within plenum 110 towards an end of plenum between points 144 and 145. As the fuel and oxidizer mixture travels along plenum 110, the mixture is transferred heat from a previous combustion cycle through inner liner 104. This transfer of heat serves to raise the temperature of the mixture in plenum 110 as well as cool the inner liner 104. Each of outer casing 102 and inner liner 104 are made of a metal, such as stainless steel, inconel, aluminum, or carbon steel. The metal of inner liner 104 enables a transfer of heat from inner chamber 112 through inner liner 104 into plenum 110. As the fuel and oxidizer mixture continues to travel through plenum 110, the mixture encounters a reduction in a cross-sectional area caused by protrusion 113, which is located along an entire inner circumference of outer casing 102. The cross-sectional area reduction caused by protrusion 113 accelerates the mixture allowing re-entraining of any liquid fuel coalesced on inner surface 151 or outer surface 153. Any number of protrusions 113, such as ranging from and including 1 to 20, may be used, and a profile of protrusion 113 may vary. In another embodiment, there are no cross sectional area reductions or protrusions. In another embodiment, when system 100 heats up via repeated combustion with a gaseous fuel/oxidizer mixture, the gaseous fuel supply is halted, for instance, by preventing the valves controlled to control the supply of fuel to inlets 122 and 124 from actuating. When the gaseous fuel supply is halted, the liquid fuel is supplied through inlets 126 and 128 via the valves that are controlled to control the supply of fuel to inlets 126 and 128 in a timing similar to how the gaseous fuel was supplied. The liquid fuel can be supplied such that liquid fuel impinges on the now hot outer surface 153 of liner 104 and/or gets directly entrained in the oxidizer flowing along the plenum 110. In this manner, the heat from liner 104 serves to vaporize fuel within plenum 110 directly, or heat the oxidizer and any liquid fuel droplets entrained in plenum 110 allowing the droplets to vaporize as the mixture of fuel and oxidizer flows along plenum 110.

The fuel and oxidizer mixture within plenum 110 continues to flow towards passage 155 and flow turning device 106, which directs the oxidizer and fuel from passage 155 toward chamber 112. The mixture continues to flow along chamber 112 towards end 149.

In an exemplary embodiment, upon determining that a sufficient amount of time, t, has passed since opening of the valves actuated to control a flow of fuel via inlets 122, 124, 126, and 128 to fill a volume of inner chamber 112, the controller sends a signal to close the valves. The oxidizer remains flowing, carrying the fuel and oxidizer mixture through a flow path defined by outer plenum 110 and inner chamber 112. Upon determining that a sufficient amount of time, r, has passed since time t, the controller sends a signal to ignition device 108.

Ignition device 108 ignites fuel within inner combustion chamber 112 upon receiving a signal from the controller. Upon igniting, a flame is formed within chamber 112 and the flame begins to consume the fuel and oxidizer mixture within chamber 112. The flame propagates and accelerates through chamber 112, generating an increase in pressure and temperature within system 100 to create a current combustion cycle. This increase in pressure and temperature can be caused by a detonation or "quasi-detonation" during the current combustion cycle. Heat generated by the current combustion cycle heats inner liner 104 including surface 153 and the heat heats oxidizer and/or fuel in plenum 110 prior to a subsequent fill and combustion cycle. The current combustion cycle ends when the combustion gases formed during the current combustion cycle exit through end 149 of inner liner 104. Upon exit of the combustion gases, remaining combustion products are purged via oxidizer supplied through inlets 118 and 120 until the subsequent fill and combustion cycle is begun. The subsequent fill and combustion cycle begins when the controller sends a signal to the valves actuated to control a flow of fuel via at least one of inlets 122, 124, 126, and 128 to open again. Ignition device 108 can be located in any single location or plurality of locations to initiate the fuel and oxidizer mixture within outer plenum 110, a passage 155, or chamber 112. Passage 155 is formed between inner liner 104 and flow turning device 106. Each of inner liner 104 and outer casing 102 are fabricated from a material, such as, inconel, stainless steel, aluminum, or carbon steel.

Figure 3:
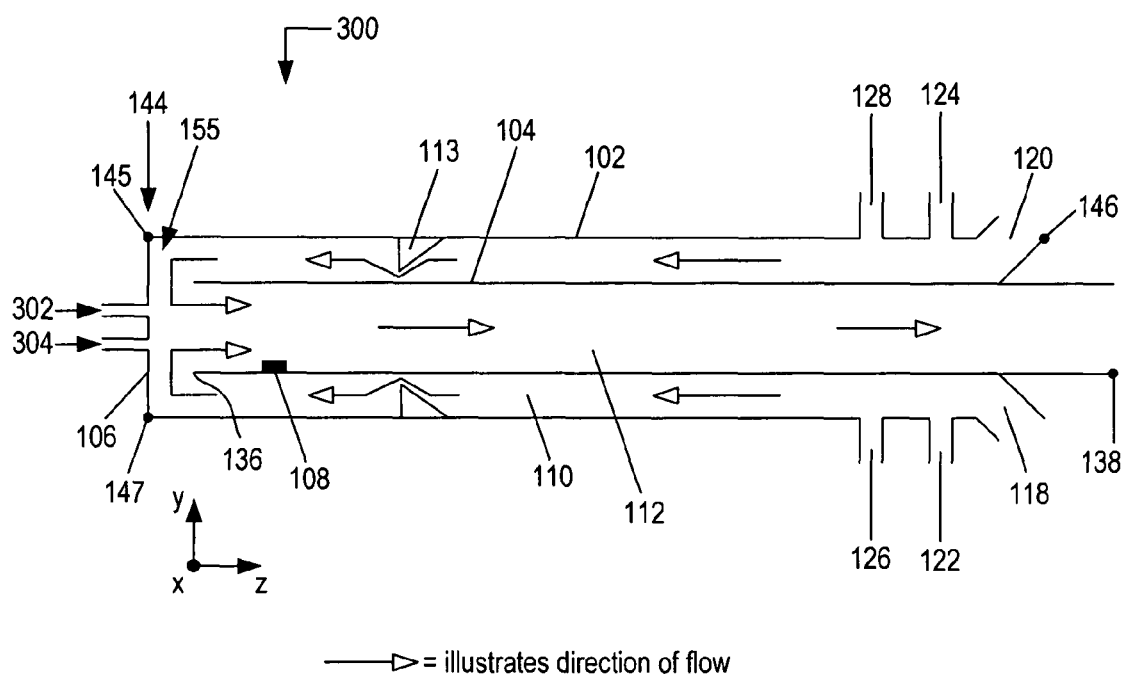
FIG. 3 is a schematic diagram of an alternative embodiment of a self-cooling, pre-heating PDC.

FIG. 3 is a schematic diagram of an embodiment of a self-cooling pre-heating PDC 300, referred to as a system 300. Oxidizer inlets 118 and 120 within system 300 remain in the same location as in FIG. 1. In system 300, liquid or alternatively gaseous fuel is injected directly into chamber 112 via an inlet 302. Liquid or alternatively gaseous fuel is injected directly into chamber 112 via an inlet 304. In an alternative embodiment, system 300 includes one of inlets 302 and 304. A valve is coupled to inlet 302 and is opened by the controller to inject fuel into chamber 112. Alternatively, a valve is coupled to inlet 304 and is opened by the controller to inject fuel into chamber 112. Moreover, the valves that are actuated to control a flow of fuel via inlets 122, 124, 126, and 128 are closed when the valves coupled to inlets 302 and 304 are open. The oxidizer is heated by the heat transfer through walls of inner liner 104 into plenum 110, however, fuel is injected via at least one of inlets 302 and 304 into the oxidizer after the oxidizer has traversed plenum 110 and as the oxidizer enters chamber 112. The fuel injected via at least one of inlets 302 and 304 combines with the oxidizer received from plenum 110 to form the mixture of fuel and oxidizer. The mixture enters from passage 155 into inner chamber 112. A mixing element may be placed either in chamber 112 and/or in passage 155 to ensure an even distribution of the fuel and oxidizer mixture, which would more readily ignite/detonate. Gaseous or liquid fuel could be injected through a plurality of orifices in the mixing element to ensure even fuel distribution. One can imagine any combination of fueling locations mentioned above, which can be used together and are not limited to just the embodiments mentioned above. The fuel and oxidizer mixture within chamber 112 is ignited using ignition device 108, which may be located anywhere along a length of chamber 112. The length of inner chamber 112 is parallel to the x-axis. In an alternative embodiment, fuel is supplied to plenum 110 via at least one of inlets 122, 124, 126, 128, 302, and 306.

Figure 4:
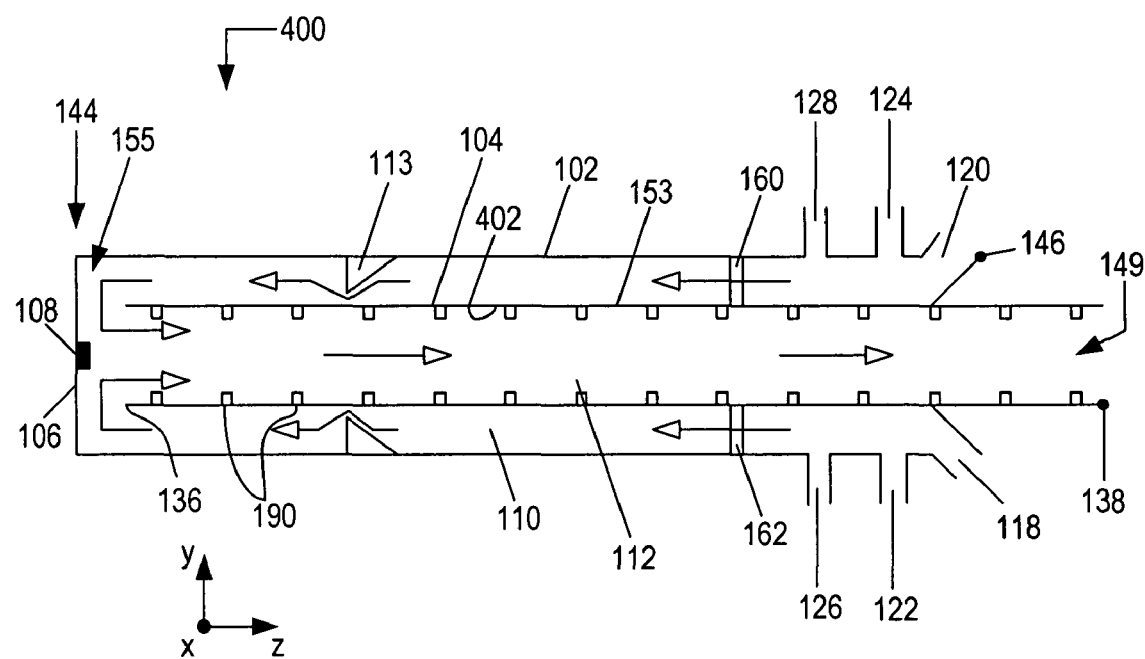
FIG. 4 is a schematic diagram of another alternative embodiment of a self-cooling, pre-heating PDC.
Figure 5:
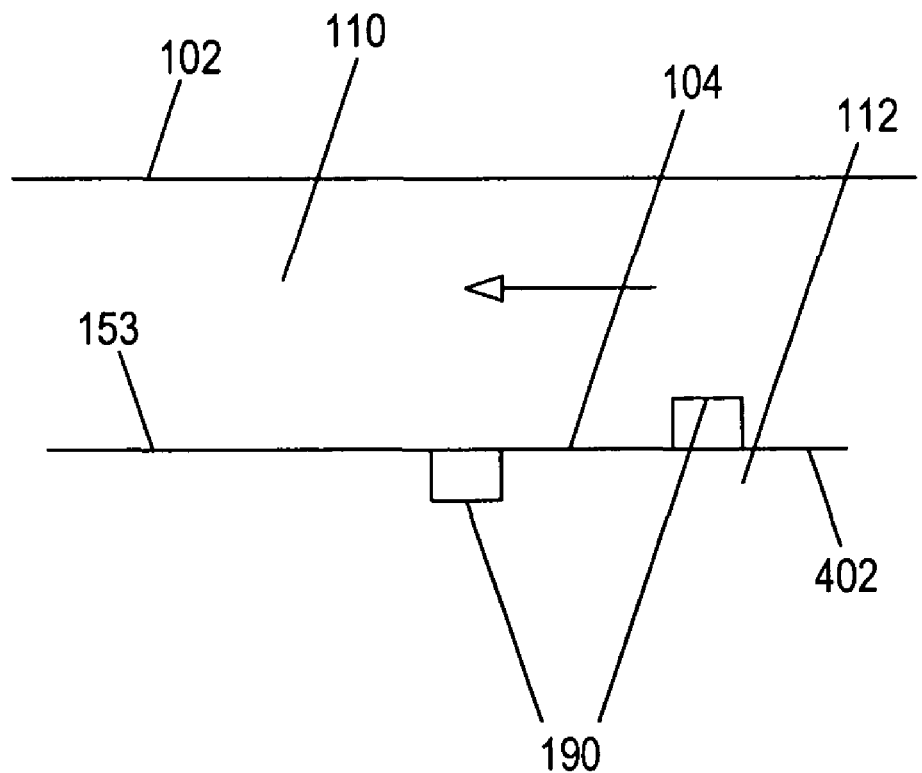
FIG. 5 is a schematic diagram of yet another alternative embodiment of a self-cooling, pre-heating PDC.

FIG. 4 is an alternative embodiment of a self-cooling pre-heating PDC 400, referred to as a system 400. System 400 is similar to system 100 except that system 400 includes a plurality of protrusions 190 along an inner surface 402 of inner liner 104 to promote turbulence within chamber 112, which enhances a transition of the flame to a detonation. System 400 includes any number, such as, ranging from and including one to 2000, protrusions 190. In an alternative embodiment, as shown in FIG. 5, protrusions 190 are integrated with, such as machined, or are attached to, such as glued, welded, and/or bolted to, the outer surface 153 and inner surface 402 of inner liner 104. In an alternative embodiment, protrusion 190 is integrated with, or attached to one of inner surface 402 and outer surface 153.

Figure 6:
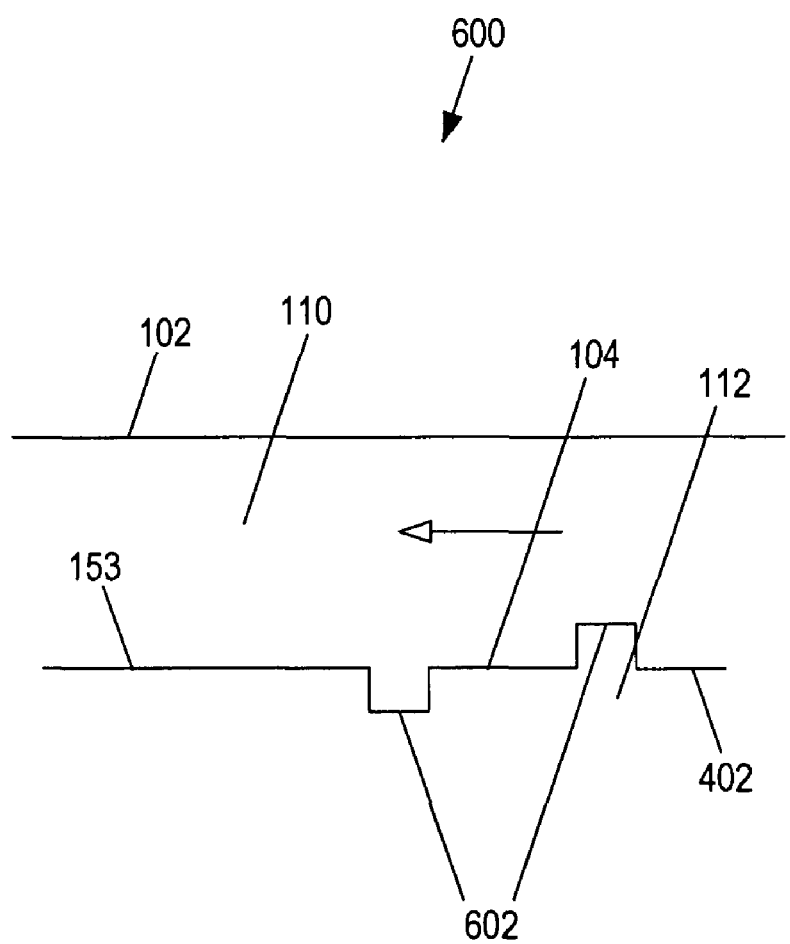
FIG. 6 is a schematic diagram of still another embodiment of a self-cooling, pre-heating PDC.

In another alternative embodiment, as shown in FIG. 6, a self-cooling pre-heating PDC 600 includes a plurality of protrusions 602 that are formed by bending surfaces 153 and 402 of inner liner 104. Self-cooling pre-heating PDC 600 is also referred to as a system 600. In another embodiment, protrusion 602 is formed on inner surface 402 in an opposite direction to that of protrusion 602 formed on outer surface 153. In another alternative embodiment, protrusion 602 formed on outer surface 153 has the same dimensions as that of protrusion 602 formed on inner surface 402. Any number of protrusions 602, such as ranging from and including one to 3000, can be formed on surfaces 153 and 402. Protrusions 602 are integrated with, such as machined/formed, or attached to, such as glued, welded, and/or bolted to, the outer surface 153 and inner surface 402 of inner liner 104. In an alternative embodiment, protrusion 602 is formed into or attached to one of inner surface 402 and outer surface 153.

Each of protrusion 190 and protrusion 602 enhances turbulence of flow within inner liner 104, enhances an amount of heat transferred from inner chamber 112 to plenum 110, and facilitates an atomization of liquid fuel coalesced in plenum 110. Each of protrusion 190 and 602 can be, but is not limited to, a ridge, or other shapes, spaced along a length and circumference of inner liner 104. The length of inner liner 104 is parallel to the x-axis. In an alternative embodiment, system 400 does not include protrusions 190 and system 600 does not include protrusions 602. In another alternative embodiment, protrusions 190 and 602 are replaced by localized recesses or grooves.

Figure 7:
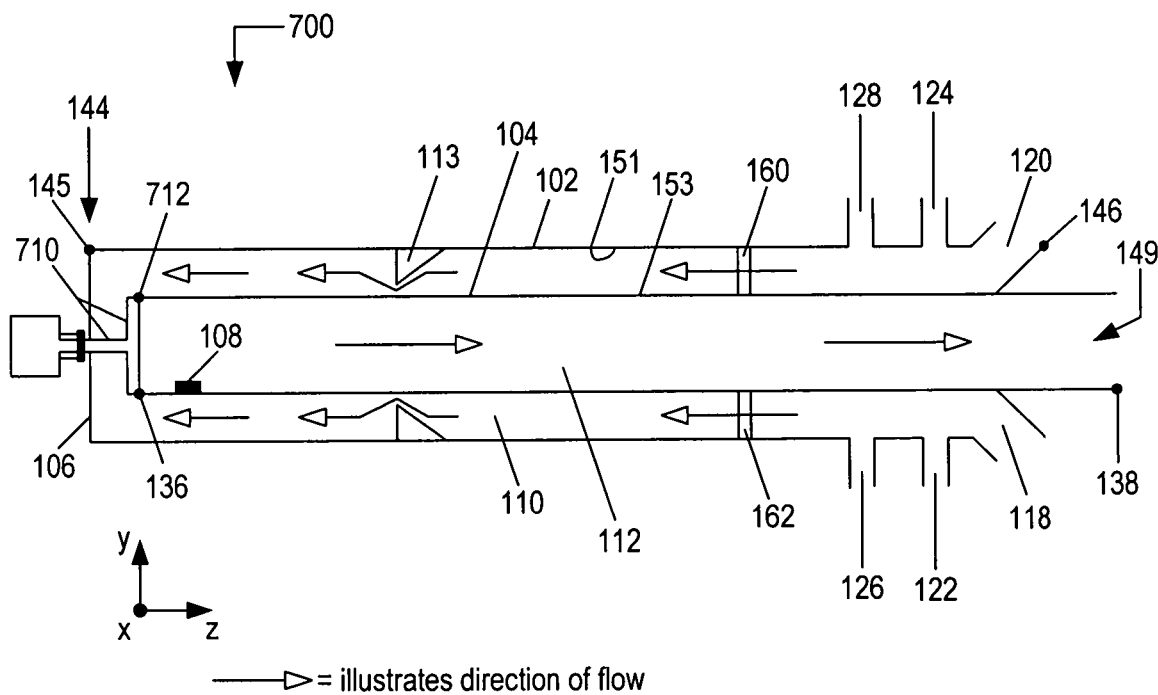
FIG. 7 is a schematic diagram of another embodiment of a self-cooling, pre-heating PDC.

FIG. 7 is a schematic of an alternative embodiment of a self-cooling pre-heating PDC 700, referred to as a system 700. System 700 is similar to system 100 except that ignition device 108 is located within inner chamber 112 and except that system 700 includes a valve element 710 downstream of plenum 110 and prior to an inlet of inner chamber 112. The inlet of inner liner 104 is located between point 136 and a point 712 of inner liner 104. Valve element 710 acts as a plunger so that when no flow is desired, the plunger is pressed up against the inlet to inner chamber 112 sealing around the circumference of inner liner 104. Valve element 710 is located between flow turning device 106 and inner chamber 112. Alternatively, valve element 710 is located within plenum 110. For example, valve element 710 acts as a plunger to seal between inner surface 151 and outer surface 153 in plenum 110 formed between outer casing 102 and inner liner 104. In another alternative embodiment, valve element 710 is integrated within flow turning device 106. The controller opens valve element 710 and the opening of valve element 710 allows flow from plenum 110 to inner chamber 112. On the other hand, the controller closes valve element 710 to prevent a flow from plenum 110 to inner chamber 112. Valve element 710 is operated, such as opened and closed, by the controller in addition to or instead of operating fuel supply inlets 122, 124, 126, and 128. The controller pulses valve element 710 to open and close valve element 710. Upon determining that a sufficient amount of time, q, has passed since opening of the valve element 710 to fill a volume of inner chamber 112 with the flow of the mixture, the controller sends a signal to close the valve element 710 and seals the inlet of the inner chamber 112. Ignition device 108 ignites the mixture within chamber 112 to generate a combustion within inner chamber 112.

In an alternative embodiment of any of the above exemplary systems 100, 300, 400, 600, and 700, an area reduction device is located at end 149. Examples of the area reduction device include, but are not limited to, a nozzle and a venturi. A purpose of this area reduction device is to increase the pressure within chamber 112 to enhance initiation and detonation transition. Another purpose of the area reduction device is to reflect shocks within chamber 112. The area reduction device is integrated with, such as machined, or attached to, such as frictionally fit, bolted, and/or welded, inner liner 104 at end 149.

Figure 8:
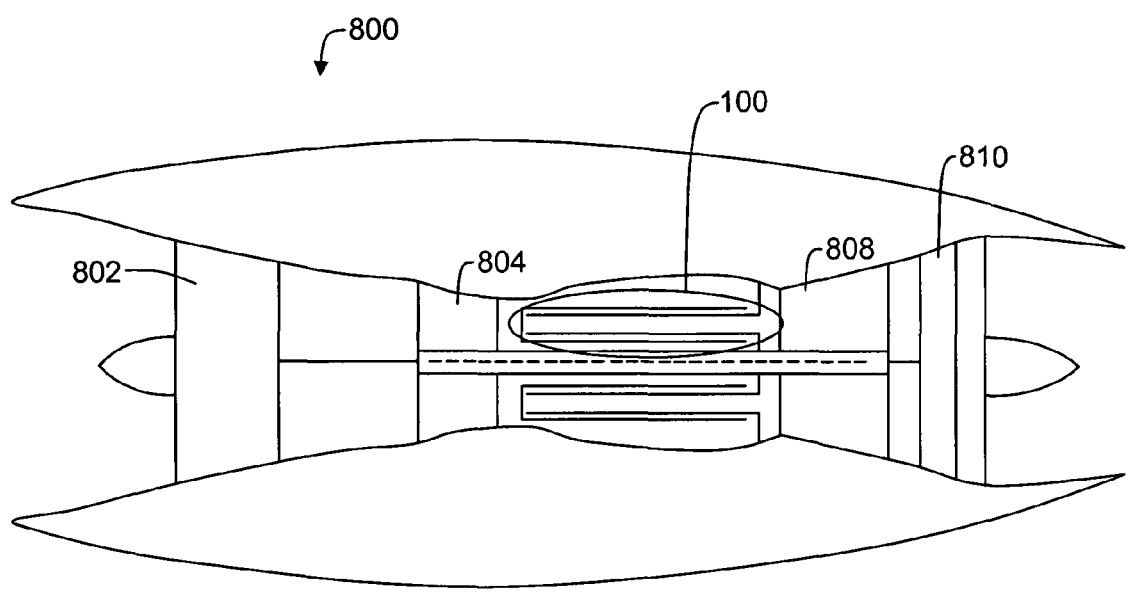
FIG. 8 is a schematic illustration of an exemplary gas hybrid turbine engine that may be used with the systems shown in FIGS. 1-7.

FIG. 8 is a schematic of an embodiment of a gas turbine engine 800 in which compressors 802 and 804 supply air to at least one of systems 100, 300, 400, 600, and 700. Pulsed detonations create the combustion within at least one of systems 100, 300, 400, 600, and 700 to turn a plurality of turbines 808 and 810 to generate thrust and turn compressors 802 and 804. A single system 100 or alternatively a plurality of systems 100 can be used within gas turbine engine 800. Similarly, in an alternative embodiment, at least one system 300 can be used within gas turbine engine 800. Moreover, in another alternative embodiment, at least one system 400 can be used within gas turbine engine 800. In another embodiment, at least one system 600 can be used within gas turbine engine 800. In yet another alternative embodiment, at least one system 700 can be used within gas turbine engine 800.

Figure 9:
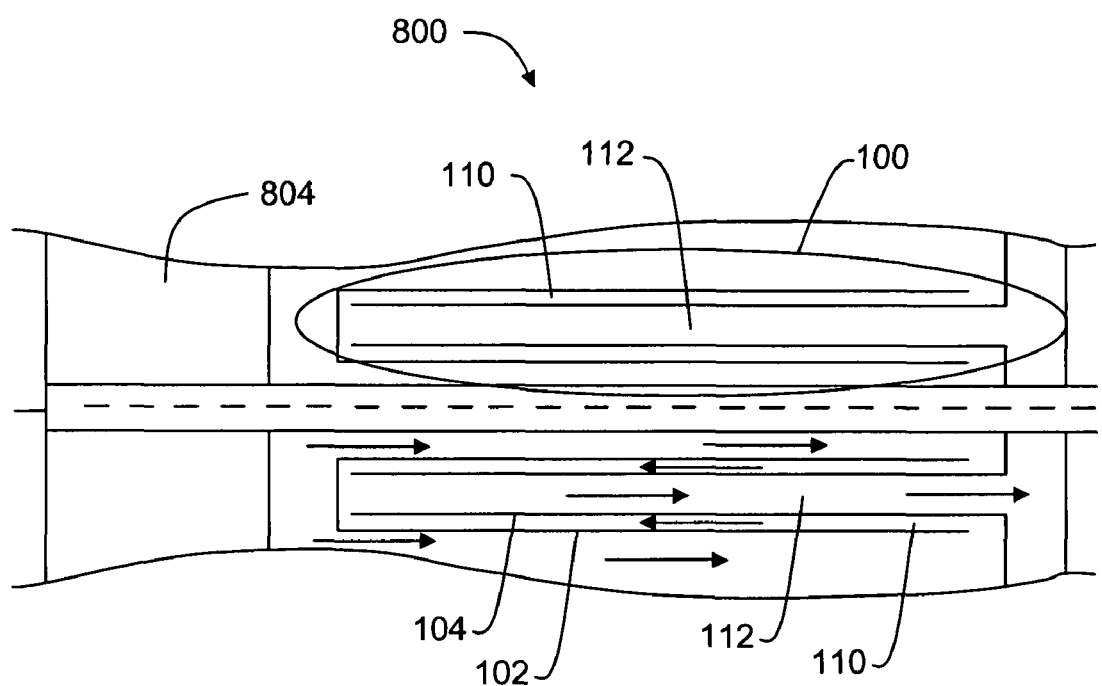
FIG. 9 is a zoomed-in view of the gas hybrid turbine engine of FIG. 8.

FIG. 9 shows a zoomed-in view of gas turbine engine 800 of FIG. 8 and illustrates an exemplary embodiment of system 100. Chamber 112 and plenum 110 are shown. Initiation occurs within at least one of systems 100, 300, 400, 600, and 700 creating hot pressurized combustion products which, expand through turbines 808 and 810. In an alternative embodiment, any combination of systems 100, 300, 400, 600, and 700 can be used within gas turbine engine 800 or for other applications, such as, propelling a missile, or driving a generator to generate electricity.

Technical effects of the herein described systems and methods include cooling of the systems 100, 300, 400, 600, and 700 using fuel and/or oxidizer prior to combustion as it flows through plenum 110 formed between outer casing 102 and inner liner 104. Cooling of inner liner 104 performed by oxidizer and/or fuel flowing within plenum 110 reduces a need for a separate source of air or other fluid to cool inner liner 104, which can become hot enough to possibly cause a mechanical failure. A separate source of air to cool inner liner 104 increases costs. Since oxidizer and/or fuel within plenum 110 is used to cool inner liner 104 and chamber 112, and also subsequently in combustion within chamber 112, the oxidizer is efficiently used and not wasted. Technical effects of the herein described systems and methods also include pre-heating fuel and/or oxidizer in the plenum 110 prior to combustion by transmitting heat within inner chamber 112 to plenum 110. Typically, vaporization of liquid fuel by a separate process/device may take a long time and results in an additional cost/power requirement of the separate device. Other technical effects include the ability to use either liquid or gaseous fuel (Dual Fueled), which is made possible by the flow path that allows for pre-heating of fuel and/or oxidizer.

While the invention has been described in terms of various specific embodiments, those skilled in the art will recognize that the invention can be practiced with modification within the spirit and scope of the claims.

What is claimed is:

1. A pulsed detonation combustor (PDC) comprising:
   an outer casing defining an outer chamber configured to receive a flow;
   an inner liner comprising at least one portion positioned within said outer chamber and configured to receive the flow from a plenum defined by an inner surface of said outer casing and an outer surface of said inner liner;
   a flow turning device with geometric features configured to direct the flow from the plenum to a hollow chamber defined within said inner liner;
   at least one fuel injection port located downstream of an inlet to said outer casing and upstream of an inlet to the hollow chamber defined within said inner liner; and
   an ignition device located downstream of said at least one fuel injection port and configured to periodically ignite fuel.

2. A system in accordance with claim 1 wherein said inner liner is positioned substantially co-axially within said outer casing.

3. A system in accordance with claim 1 wherein said inner liner is fabricated from a material that facilitates a transfer of heat to the flow in said plenum.

4. A system in accordance with claim 1 wherein said inner liner comprises an inner surface and outer surface wherein at least on of said inner and outer surfaces including at least one protrusion for promoting detonation transition.

5. A system in accordance with claim 1 wherein said inner liner comprises an inner surface and outer surface formed with at least one shaped portion that increases a cross-sectional surface area of said inner liner to enhance heat transfer to the flow in said plenum.

6. A system in accordance with claim 1 comprising a valve element coupled to the inlet to the hollow chamber formed within inner liner.

7. A system in accordance with claim 1 wherein gaseous fuel is injected into said PDC through at least one fuel injection port.

8. A system in accordance with claim 1 wherein liquid fuel is injected into said PDC through at least one fuel injection port.

9. A system in accordance with claim 1 wherein said plenum comprises a plurality of area reducing features that serve to re-entrain a plurality of coalesced liquid fuel droplets into flowing oxidizer and/or fuel.

10. A system in accordance with claim 1 wherein said inner liner has an area reduction at an exit of said inner liner to increase a pressure within said PDC.

11. A pulsed detonation combustor system comprising:
a fuel supply configured to supply fuel;
an oxidizer supply configured to supply an oxidizer;
an outer casing defining an outer chamber configured to receive a flow from at least one of said fuel supply and said oxidizer supply;
an inner liner comprising at least one portion positioned within said outer chamber and configured to receive the flow from a plenum defined by an inner surface of said outer casing and an outer surface of said inner liner;
a flow turning device with geometric features configured to direct the flow from the plenum to a hollow chamber defined within said inner liner;
at least one fuel injection port located downstream of an inlet to outer casing and upstream of an inlet to the hollow chamber defined within said inner liner; and
an ignition device located downstream of said at least one fuel injection port and configured to periodically ignite fuel.

12. A system in accordance with claim 11 wherein said inner liner is positioned substantially co-axially within said outer casing.

13. A system in accordance with claim 11 wherein said inner liner is fabricated from a material that facilitates a transfer of heat to the flow in said plenum.

14. A system in accordance with claim 11 wherein said inner liner comprises an inner surface and outer surface wherein at least on of said inner and outer surfaces including at least one protrusion for promoting detonation transition.

15. A system in accordance with claim 11 wherein said inner liner comprises an inner surface and outer surface formed with at least one shaped portion that increases a cross-sectional surface area of said inner liner to enhance a heat transfer to the flow in said plenum.

16. A method for generating thrust in a self-cooling, pre-heating pulsed detonation combustor, said method comprising:
receiving a flow in an outer casing defining an outer chamber;
receiving the flow from a plenum defined by an inner surface of the outer casing and an outer surface of an inner liner located within the outer chamber;
directing the flow from the plenum to a hollow chamber within the inner liner;
placing at least one fuel injection port downstream of an inlet to the outer casing and upstream of an inlet to the hollow chamber defined within said inner liner; and
periodically igniting fuel by an ignition device located downstream of the at least one fuel injection port.

17. A method in accordance with claim 16 further comprising positioning the inner liner substantially co-axially with the outer casing.

18. A method in accordance with claim 16 further comprising fabricating the inner liner from a material that facilitates a transfer of heat to the flow in the plenum.

19. A method in accordance with claim 16 wherein the inner liner comprises an inner surface and outer surface, at least on of the inner and outer surfaces including at least one protrusion, said method further comprising promoting, by the at least one protrusion, a detonation transition.

20. A method in accordance with claim 16 wherein the inner liner comprises an inner surface and outer surface formed with at least one shaped portion that increases a cross-sectional surface area of the inner liner, said method further comprising enhancing, by the at least one shaped portion, a heat transfer to the flow in the plenum.

* * * * *

UNITED STATES PATENT AND TRADEMARK OFFICE
CERTIFICATE OF CORRECTION

| | | |
|---|---|---|
| PATENT NO. | : 7,966,803 B2 | Page 1 of 1 |
| APPLICATION NO. | : 11/346809 | |
| DATED | : June 28, 2011 | |
| INVENTOR(S) | : Chapin et al. | |

It is certified that error appears in the above-identified patent and that said Letters Patent is hereby corrected as shown below:

In Column 8, Line 64, in Claim 4, delete "on of" and insert -- one of --, therefor.

In Column 10, Line 3, in Claim 14, delete "on of" and insert -- one of --, therefor.

In Column 10, Line 33, in Claim 19, delete "on of" and insert -- one of --, therefor.

Signed and Sealed this
Fourteenth Day of February, 2012

David J. Kappos
*Director of the United States Patent and Trademark Office*